UNITED STATES PATENT OFFICE 2,385,788

HYDROXYDIHYDRONORPOLYCYCLOPENTADIENES AND METHOD FOR THEIR PREPARATION

Herman A. Bruson, Philadelphia, Pa., assignor to The Resinous Products & Chemical Company, Philadelphia, Pa., a corporation of Delaware No Drawing. Application February 20, 1943, Serial No. 476,645

8 Claims. (Cl. 260—617)

This invention relates to hydroxydihydronorpolycyclopentadienes and a method for their preparation.

In accordance with the disclosure of the present application, which is a continuation-in-part of copending application Serial No. 442,188, filed May 8, 1942, polymers of cyclopentadiene containing not more than two double bonds per molecule are reacted with water in the presence of sulfuric acid to form unsaturated hydration products with a simultaneous molecular rearrangement of the original polycyclopentadiene ring system to a norpolycyclopentadiene ring system, as hereinafter described.

Typical polycyclopentadienes which can be used for the purpose of this invention are, for example, dicyclopentadiene, tricyclopentadiene, tetracyclopentadiene, pentacyclopentadiene, and homologues thereof, and include isomeric polycyclopentadiene and mixtures thereof. All of these possess two double bonds per molecule. Such polymers are crystalline solids obtainable by heating cyclopentadiene at 150°–200° C. in a closed vessel. They have the general formula:

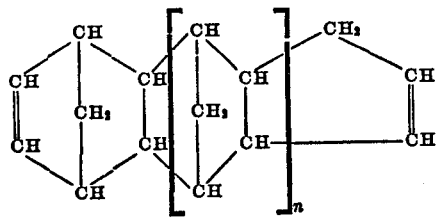

wherein $n$ is zero or a small integer, such as 1, 2, or 3.

It has been found that polycyclopentadienes having two double bonds per molecule react readily with aqueous sulfuric acid to yield hydroxydihydronorpolycyclopentadiene even when an excess of the acid is used. In this reaction, the hydration occurs at the double bond of the cycle containing the endomethylene bridge with a simultaneous rearrangement in this ring to give a new type of compound.

For example, dicyclopentadiene reacts with aqueous sulfuric acid as follows:

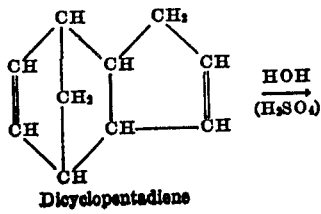

Dicyclopentadiene

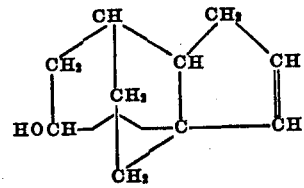

Hydroxydihydronordicyclopentadiene

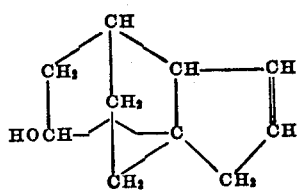

Hydroxydihydronordicyclopentadiene

In an analogous manner, tricyclopentadiene reacts only at the double bond of the endomethylene cycle with simultaneous rearrangement of the latter:

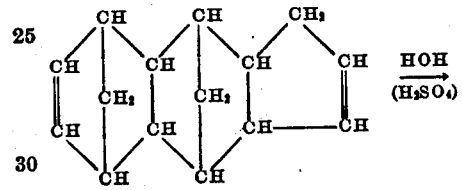

Tricyclopentadiene or

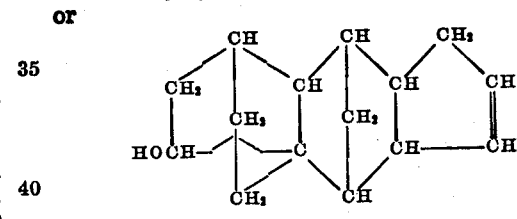

Hydroxydihydronortricyclopentadiene or

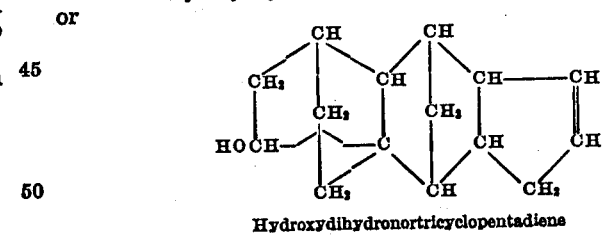

Hydroxydihydronortricyclopentadiene

Similarly tetracyclopentadiene and pentacyclopentadiene add water to form rearranged alcohols.

All of these alcohols are new substances. They are secondary alcohols of definite physical properties and chemical composition. In view of the fact that they are derived from polycyclopentadienes but possess a new and different ring system, they are referred to herein for the sake of brevity as "norpolycyclopentadiene" derivatives.

It is surprising that only one double bond adds the elements of water to the complete exclusion of the second double bond present in the molecule, even when an excess of hydrating agent is present, particularly since both double bonds are of the secondary type and are apparently equivalent.

In the preparation of the hydroxydihydronorpolycyclopentadienes of this invention, there may be used aqueous sulfuric acid of a wide range of concentration. In fact, it is possible to use 95%–100% sulfuric acid if care is taken to keep the temperature low, as, for example, 0°–20° C., and to hydrolyze subsequently the unstable intermediate sulfuric acid addition product by the addition of water. For practical purposes, however, it is advantageous to employ aqueous sulfuric acid of from about 20% to about 50% $H_2SO_4$ content at temperatures between about 65° and 115° C., although both lower and higher temperatures are operative, the optimum yields being obtained with aqueous 25%–35% sulfuric acid at 90°–110° C. It has been found desirable to use a full molecular proportion of $H_2SO_4$ per mol of polycyclopentadiene. This appears to lessen or prevent the formation of ethers of hydroxydihydronorpolycyclopentadienes which are otherwise formed simultaneously with the alcohols desired. It is to be understood, however, that the choice of temperature, proportions, and concentrations is only incidental to the spirit of the invention, which is not to be considered as limited by these features, since good yields are possible with wide variations in working conditions.

In order to promote good contact between the aqueous sulfuric acid and the polycyclopentadienes, it is desirable that the two materials be rapidly stirred together. Dispersion of the polycyclopentadienes in aqueous sulfuric acid may be assisted by use of dispersing or emulsifying agents which are stable to hot sulfuric acid. Suitable agents for the purpose are alkylated naphthalene sulfonic acid, alkyl sulfonic acids, sulfonated petroleum fractions, aliphatic long chain amines, and the like, containing alkyl groups of eight to eighteen carbon atoms or more. To assist further in the dispersion, inert organic solvents may be used, such as, by way of example, saturated aliphatic hydrocarbons or hydroaromatic hydrocarbons, including octane, methyl cyclohexane and acid-washed kerosene.

The higher polycyclopentadienes, notably tetracyclopentadiene and pentacyclopentadiene, because of their high melting points and insolubility in many solvents, are advantageously dissolved in dicyclopentadiene or tricyclopentadiene or a mixture of both, so as to form a low-melting eutectic which is fluid at the reaction temperature used, and are thus rendered amenable to the hydration. When the reaction mixture is washed and vacuum-distilled, the individual hydroxydihydronorpolycyclopentadienes can be separated from one another.

The following examples illustrate this invention. Parts are by weight.

Example 1

A mixture of 264 parts of dicyclopentadiene and 800 parts of aqueous 25% sulfuric acid was stirred rapidly and heated under a reflux condenser at 104°–107° C. for four and one-half hours. The aqueous sulfuric acid layer was then separated and the oil layer was washed successively with hot water, dilute soda solution, and finally again with hot water. The oil was dried and distilled in vacuum at 6 mm. absolute pressure of mercury. The product which distilled over between 105° and 115° C./6 mm. was hydroxydihydronordicyclopentadiene. It was a viscid, colorless oil. The yield was 250 parts, or 83.4% of theory.

Example 2

A mixture of 264 parts of dicyclopentadiene and 817 parts of aqueous 30% acid was stirred and heated for five hours at 94°–98° C. on a steam bath in a vessel attached to a reflux condenser. The reaction product was washed and worked up as in Example 1. The yield of hydroxydihydronordicyclopentadiene was 249 parts, or 83% of theory.

Example 3

A mixture of 264 parts of dicyclopentadiene and 1,000 parts of aqueous 20% sulfuric acid was stirred for four and one-quarter hours at 95° C. and was worked up as in Example 1. The yield of hydroxydihydronordicyclopentadiene boiling between 100° and 115°–6 mm. was 150 parts.

Example 4

A mixture of 264 parts of dicyclopentadiene and 250 parts of aqueous 40% sulfuric acid was stirred and heated for six and three-quarter hours at 95° C. and was worked up as in Example 1. The yield of hydroxydihydronordicyclopentadiene was 181 parts, or 60% of theory. In addition, 36 parts of colorless oil boiling at 180°–190°/2 mm. was isolated, corresponding, according to its analysis, to the ether of the above alcohol, having the formula $C_{10}H_{13}$—O—$C_{10}H_{13}$.

Example 5

A mixture of 132 parts of dicyclopentadiene and 250 parts of aqueous 50% sulfuric acid was stirred rapidly at 95° C. for two and one-half hours. An equal volume of water was then added and steam passed through the mixture while the volatile steam distillate was condensed. The oil layer of the distillate was separated and redistilled in vacuum to yield about 35 parts of hydroxydihydrodicyclopentadiene.

Example 6

To a solution of 132 parts of dicyclopentadiene in 250 parts of methylcyclohexane cooled to 5° C., 106 parts of 95% sulfuric acid was added gradually while the reaction mixture was stirred and maintained at 5°–10° C. The mixture was stirred for twenty minutes, then was poured into ice water and steam-distilled. Considerable dark resin separated during the steaming. The mixture of hydroxydihydronordicyclopentadiene and methylcyclohexane which distilled over with the steam was condensed and separated by distillation into pure hydroxydihydronordicyclopentadiene which boiled at 95°–100° C./1 mm. and gave an iodine number of 164 by the Hanus method (theory 169).

Example 7

(a) A mixture of 114 parts of α-tricyclopentadiene and 150 parts of 40% sulfuric acid was rapidly stirred and heated under reflux for five hours at 115°–125° C. The dark viscous mass was stirred with hot water and the oil layer separated with the aid of toluene. The toluene solution was washed, first with hot water, then with dilute soda solution, and finally with hot water. The toluene was evaporated off and the residual, dark, very viscous mass distilled under reduced pressure at 2 mm. absolute pressure of mercury.

Hydroxydihydronortricyclopentadiene distilled over as a colorless viscous oil at 150°–170°/2 mm. in a yield amounting to 41 parts. Upon redistillation at 11 mm., it boiled at 180°–185° C. It crystallizes on standing to a wax-like solid which can be recrystallized from nitroethane in the form of colorless needles, melting point 115° C. It is very soluble in methanol, benzene, ether, or acetone.

A higher boiling fraction, boiling point 260°–280°/2 mm., was also obtained as a viscous pale yellow liquid which rapidly solidified to a hard, transparent, resinous solid in a yield of 32 parts. It consists essentially of the ether of the above alcohol, having the formula

(b) In the same manner, a mixture of 99 parts of tricyclopentadiene (mostly β-isomer) and 167 parts of aqueous 30% sulfuric acid was boiled for seven hours at 109°–115° C. under reflux with rapid stirring. The viscous mass was cooled, dissolved in toluene and washed several times with hot water followed by a wash with soda solution and finally water. Upon evaporation of the toluene, 100 parts of a black tar-like mass was obtained which, upon distillation under reduced pressure at 2 mm., yielded 42 parts of hydroxydihydronortricyclopentadiene, which, upon recrystallization from nitroethane, formed colorless needles, melting point 98° C.

Example 8

(a) A mixture of 51 parts of tetracyclopentadiene, 100 parts of dicyclopentadiene, and 334 parts of aqueous 30% sulfuric acid was stirred for five and one-half hours at 110°–114° C. under reflux. The very viscous dark oil was separated from the sulfuric acid layer. The oil was dissolved in toluene, washed several times with hot water, then with hot 5% sodium carbonate solution, and finally again with hot water. It was then dried and distilled under reduced pressure. The hydroxydihydronordicyclopentadiene (75 parts) came over at 90°–100° C. at 3 mm. The fraction boiling at 220°–240° C./3 mm. was a pale yellow, transparent solid, having a hydroxyl number of 190 (theory for hydroxy-dihydronortetracyclopentadiene is 199). It is readily soluble in alcohol and can be recrystallized from 1-nitropropane.

(b) In the same manner, hydroxydihydronorpentacyclopentadiene is obtained as a hard, transparent solid by heating 50 parts of pentacyclopentadiene with 100 parts of dicyclopentadiene and 330 parts of 30% sulfuric acid, washing as above, and distilling off the hydroxydihydronordicyclopentadiene in vacuo. The hydroxydihydronorpentacyclopentadiene boils above 250° C. at 1 mm.

Pure hydroxydihydronordicyclopentadiene, as obtained by careful vacuum distillation of any of the above preparations, is a colorless, rather viscid liquid boiling at 102°–104° C./7 mm. or 240° C./773 mm. It does not solidify or crystallize at 0° C. It has the formula $C_{10}H_{14}O$ and the following constants: $d_4^{25}$ 1.0773; $n_D^{25}$ 1.5246. It is insoluble in water but miscible in all proportions with methanol, acetone, dioxane, benzene, ether, kerosene, petroleum oils, castor oil, and the like. It possesses a camphoraceous odor, suggestive of borneol. With phthalic anhydride, it gives a crystalline mono-acid phthalate which melts at 139°–141° C. With phenyl isocyanate it yields a crystalline phenyl urethane having a melting point of 164°–165° C. Upon oxidation with chromic acid in acetic acid at 50° C., it yields the corresponding ketodihydronordicyclopentadiene as a colorless liquid, boiling at 109° C./13 mm., possessing values of $d_4^{25}$ 1.0759 and $n_D^{25}$ 1.5146, and yielding a semicarbazone which melts at 200° C. and an oxime which melts at 105°–106° C. Upon catalytic hydrogenation, hydroxydihydronordicyclopentadiene yields the corresponding hydroxytetrahydronordicyclopentadiene, which is a crystalline solid having a melting point of 53° C.

The hydroxydihydronorpolycyclopentadienes are useful as solvents, as plasticizers, as hydraulic fluids, and as components of hydraulic fluids in brake or recoil mechanisms, as components for preparing synthetic waxes and resins, and as intermediates for drugs, wetting agents, insecticides, emulsifying agents, detergents, bactericides, and cosmetics. As a solvent, hydroxydihydronordicyclopentadiene is particularly useful in printing inks because of its high boiling point and dissolving power for resins and oils. Chemically, the hydroxydihydronorpolycyclopentadienes react with organic monocarboxylic acids, such as acetic, crotonic, valeric, etc., or polycarboxylic acids, such as phthalic, succinic, maleic, oxalic, or tricarballylic, to form esters useful in the plastic arts.

The new alcohols of this invention are conveniently represented by the following general formula, which is in accord with the most probable structure of these compounds:

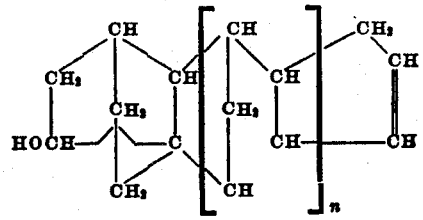

The compounds of this invention may be considered as acid-catalyzed, addition-rearrangement products of water and crystalline polycyclopentadienes having two double bonds and one to four endomethylene cycles per molecule and have been suitably named "hydroxydihydronorpolycyclopentadienes." The general formula for these alcohols may also be represented

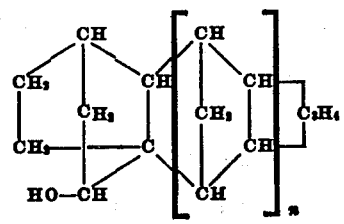

wherein $C_3H_4$ is a propenylene group which in conjunction with the adjoining carbon atoms forms a cyclopenteno group.

The double bond in the terminal five-membered cycle is reactive with such addends as hydrogen, chlorine, bromine, iodine, iodine bromide, iodine chloride, thiocyanogen, etc.

Although in the above examples practically pure polycyclopentadienes have been used, the process shown may also be applied to mixtures of hydrocarbons which contain 5% or more of the polycyclopentadienes having two double bonds per molecule, such as are obtained in the thermal cracking of petroleum or in the manufacture of water gas. The reaction of the polycyclopentadienes provides a new means for separating the components of mixtures of unsaturated hydrocarbons and gives new utility to such products.

I claim:

1. A method for preparing hydroxydihydronorpolycyclopentadienes having a terminal five-membered cycle containing a double bond, which comprises heating aqueous sulfuric acid containing from about 20% to about 50% H₂SO₄ with a crystalline polymer of cyclopentadiene having the formula:

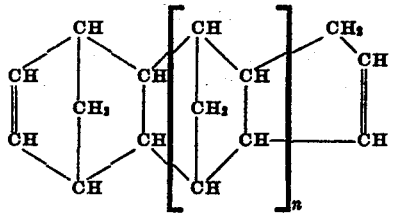

wherein $n$ is a number from 0 to 3, inclusive.

2. A method for preparing hydroxydihydronorpolycyclopentadienes having a terminal five-membered cycle containing a double bond, which comprises reacting approximately molecularly equivalent proportions of sulfuric acid containing from about 50% to 80% of water and a crystalline polymer of cyclopentadiene having the formula:

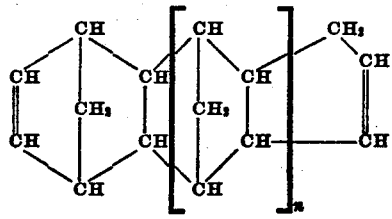

wherein $n$ is a number from 0 to 3, inclusive, at a temperature between about 65° and 115° C.

3. A method for preparing hydroxydihydronordicyclopentadiene having a terminal five-membered cycle containing a double bond, which comprises reacting dicyclopentadiene with aqueous sulfuric acid.

4. A method for preparing hydroxydihydronortricyclopentadiene having a terminal five-membered cycle containing a double bond, which comprises reacting tricyclopentadiene with aqueous sulfuric acid.

5. A method for preparing hydroxydihydronordicyclopentadiene having a terminal five-membered cycle containing a double bond, which comprises heating dicyclopentadiene with approximately a molecularly equivalent quantity of aqueous sulfuric acid of about 20% to 50% H₂SO₄ content at a temperature from about 65° to 115° C.

6. An acid-catalyzed, addition-rearrangement product of water and a crystalline polycyclopentadiene having two double bonds and one to four endomethylene cycles per molecule, said product being a hydroxydihydronorpolycyclopentadiene, a compound having a secondary alcoholic hydroxyl group in one terminal five-membered cycle and a cyclopenteno ring as an opposite terminal cycle.

7. An acid-catalyzed, addition-rearrangement product of water and dicyclopentadiene, said product, when pure, being a colorless oil boiling at 102-104° C./7 mm., and being hydroxydihydronordicyclopentadiene, a compound having a secondary alcoholic hydroxyl group in one terminal five-membered cycle and a cyclopenteno ring as an opposite terminal cycle.

8. An acid-catalyzed, addition-rearrangement product of water and tricyclopentadiene having two double bonds and one to four endomethylene cycles per molecule, said product, when pure, being a colorless crystalline solid melting at 115° C. and boiling at 180°-185° C./11 mm., and being hydroxydihydronortricyclopentadiene, a compound having a secondary alcoholic hydroxyl group in one terminal cycle and a cyclopenteno ring as an opposite terminal cycle.

HERMAN A. BRUSON.